(12) United States Patent
Pokorny et al.

(10) Patent No.: US 12,095,335 B2
(45) Date of Patent: Sep. 17, 2024

(54) SUBMERSIBLE-RATED ROLLER TABLE MOTOR

(71) Applicant: Vault Motors LLC, South Range, WI (US)

(72) Inventors: Michael Pokorny, Kalispell, MT (US); Steve A. Schick, South Range, WI (US)

( * ) Notice: Subject to any disclaimer, the term of this patent is extended or adjusted under 35 U.S.C. 154(b) by 318 days.

(21) Appl. No.: 17/873,731

(22) Filed: Jul. 26, 2022

(65) Prior Publication Data

US 2024/0039359 A1    Feb. 1, 2024

(51) Int. Cl.
*H02K 5/132* (2006.01)
*H02K 5/10* (2006.01)
*H02K 5/22* (2006.01)
*H02K 7/08* (2006.01)

(52) U.S. Cl.
CPC ............ *H02K 5/132* (2013.01); *H02K 5/10* (2013.01); *H02K 5/225* (2013.01); *H02K 7/08* (2013.01)

(58) Field of Classification Search
CPC .......... H02K 5/132; H02K 5/10; H02K 5/225; H02K 7/08
See application file for complete search history.

(56) References Cited

U.S. PATENT DOCUMENTS

| | | | |
|---|---|---|---|
| 5,051,007 A | 9/1991 | Maddox et al. | |
| 8,408,806 B2 * | 4/2013 | Tecza | F16C 19/542 384/405 |
| 10,312,766 B2 * | 6/2019 | Pokorny | H02K 7/083 |
| 2017/0102034 A1 | 4/2017 | Manabe et al. | |
| 2019/0203727 A1 | 7/2019 | Perrino | |
| 2024/0039359 A1 * | 2/2024 | Pokorny | H02K 7/08 |

FOREIGN PATENT DOCUMENTS

| | | |
|---|---|---|
| CN | 203554152 U | 4/2014 |
| CN | 206977211 U | 2/2018 |
| CN | 112160991 A | 1/2021 |
| CN | 216078299 U | 3/2022 |
| DE | 2157374 A1 | 5/1973 |
| DE | 2951260 A1 | 7/1981 |
| EP | 0756897 A1 | 2/1997 |
| EP | 1507328 A2 | 2/2005 |

(Continued)

*Primary Examiner* — Robert W Horn
(74) *Attorney, Agent, or Firm* — Antoinette M. Tease

(57) ABSTRACT

A submersible-rated motor having a motor housing that encloses a stator and rotor and partially encloses a drive shaft. The motor has a terminal plate assembly, combined seal/bearing housing, rotating seal assembly, and drive-end and non-drive-end oil peelers configured to peel oil from the rotor while it is rotating. The motor incorporates first and second snap rings to secure the combined seal/bearing housing to the motor housing and the first ball bearing to the combined seal/bearing housing, respectively. The first ball bearing is situated inside of the combined seal/bearing housing on the drive shaft between the rotating seal assembly and the proximal end of the rotor. A second ball bearing is situated inside of the motor housing on the drive shaft between the distal end of the rotor and terminal plate assembly. The rotating seal assembly includes a single, self-lubricating rotating seal, seal spring and single-seal driver.

12 Claims, 16 Drawing Sheets

(56) References Cited

FOREIGN PATENT DOCUMENTS

| | | |
|---|---|---|
| JP | 2001032914 A | 6/2001 |
| JP | 2001173762 A | 6/2001 |
| JP | 2001200847 A | 7/2001 |
| JP | 2008048510 A | 2/2008 |
| JP | 2012115012 A | 6/2012 |
| JP | 2013165542 A | 8/2013 |
| JP | 2014059055 A | 4/2014 |
| WO | WO 2021/052676 A1 | 3/2021 |

* cited by examiner

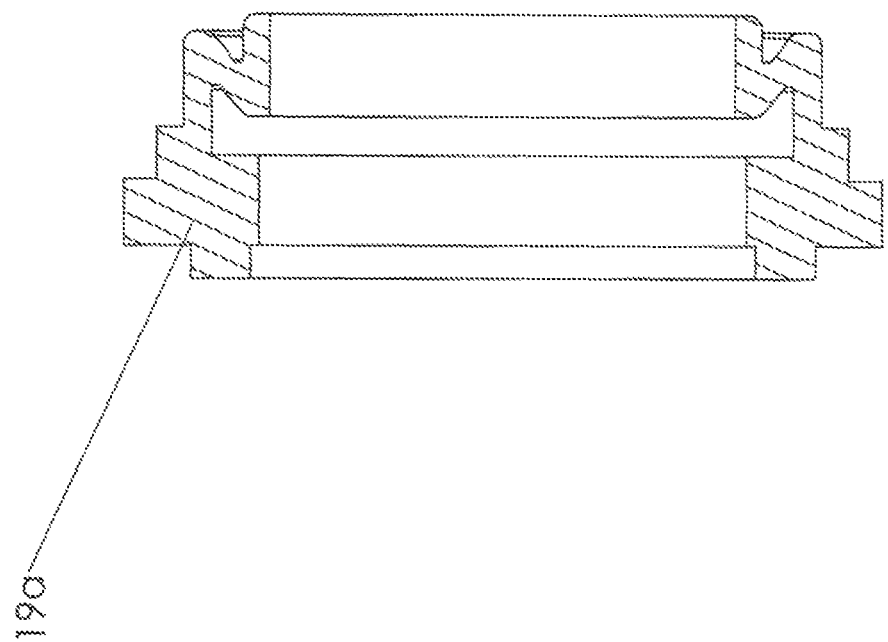

SUBMERSIBLE-RATED ROLLER TABLE MOTOR

BACKGROUND OF THE INVENTION

1. Field of the Invention

The present invention relates generally to the field of electric motors, and more particularly, to a submersible-rated electric motor that is specifically designed for use in connection with a roller table in the steel mill industry.

2. Description of the Related Art

Roller tables are used in the steel mill industry to move red-hot steel as it is being extruded, shaped and sprayed with water. Roller tables consist of a series of motor-driven rollers that extend outward from the side of the roller table. These motors are electric, and covers are installed over them to insulate them from the water that is being sprayed onto the red-hot steel. These covers, however, do not prevent ambient moisture and dust solids from entering the motor housing. As the motors are operated, the electrical stator and bearings heat the air inside the motor housing, causing the air to expand and be expelled through orifices in the motor housing. Conversely, as the motor cools, air volume inside the motor housing decreases, thereby drawing ambient air into the motor housing.

In a steel mill, this ambient air contains high levels of moisture and dust solids. Because conventional roller table motors are not sealed or otherwise designed to maintain a constant air volume inside of the motor housing, the housing operates like an air pump as it cycles through heating and cooling operations. Eventually, sufficient moisture will condense on the electrical stator and/or sufficient dust solids will enter the bearings to cause the motor to fail. Motor failure is rampant in the steel mill industry and costly both in terms of decreased production and motor replacement expenses.

There are examples in the prior art of submersible motors and motors that attempt to alleviate issues associated with the changes in air pressure inside of the motor as it heats and cools, but none of these inventions incorporates the structural design features of the present invention, nor are such inventions specifically adapted for use on a steel mill roller table. For example, U.S. Pat. No. 4,598,219 (Gaylord et al., 1986) discloses a submersible motor with a gas-filled housing in which gas is permitted to enter the housing through a first conduit and discharged (along with accumulated liquid) from the housing through a second conduit. Although the motor enclosure is submersible, the invention utilizes an external source of compressed air to supply pressurized air to the motor. This pressurization of air inside of the motor maintains a positive pressure on the seals, thereby preventing liquid from traveling into the motor.

U.S. Pat. No. 9,461,517 (Bratthaell et al. 2016) involves an electrical motor for a submersible machine. Like the present invention, this invention incorporates seals that reside in an oil bath, but this motor is dissimilar to the present invention in that it does not purport to maintain a constant air volume inside of the motor housing. Stranded cable conductors are used (see discussion of stranded cables in Detailed Description of Invention section below), but the invention does not incorporate any mechanism for preventing the flow of air through voids in the stranded cable. Further examples of non-submersible motors are discussed below.

U.S. Pat. No. 5,793,132 (Hirose et al., 1998) describes an electric wheel motor in which an electric leader line extends from the inside to the outside of the main motor body and connects the inside of the main motor body to the outside of the main motor body via a breather passage. The purpose of this breather passage is to allow air to move into and out of the main motor body, thereby equalizing pressure between the inside of the motor body and the outside environment. This motor is not submersible.

U.S. Pat. No. 8,636,479 (Kenyon el al., 2014) and U.S. Patent Application Pub. No. 20140101926 (Kenyon et al.) describe a blower with a stationary portion having an inlet and an outlet and a rotating portion that is driven by a motor. The stationary portion includes a housing, a stator component, and a tube. The rotating portion includes one or more bearings along the inner surface of the tube to support a rotor within the tube. The purpose of this invention is to supply air at positive pressure, presumably to a continuous positive airway pressure (CPAP) machine. The motor described in this patent is not submersible, nor does it incorporate any shaft seals.

U.S. Pat. No. 9,450,475 (Zumstein el al., 2016) provides an aquatic pump motor with a motor shell, drive unit, electronics assembly configured to operate the drive unit, and shaft coupled to the drive unit. In one embodiment, the motor is totally enclosed, the shaft is scaled with a labyrinth seal, and the electronics assembly is contained within the motor shell. The motor is cooled with first and second fun assemblies. This motor is not submersible and is designed to reduce noise.

U.S. Patent Application Pub. No. 20160118855 (Maruyama et al.) discloses a waterproof motor with a columnar motor body and a center hole that penetrates the motor body in an axial direction. The motor body housing has a cylindrical part that covers the peripheral surface of the motor body, a rotation output part that is situated on an upper side of the cylindrical part in the axial direction and fixed to rotary bodies of the motor body, and a fixed part on a lower side of the cylindrical part in the axial direction and fixed to fixed bodies of the motor body. The housing is sealed at only one place on the cylindrical part in the axial direction. The invention incorporates the use of an air purge system to maintain a positive pressure inside of the motor housing. Although purportedly waterproof, this motor is not submersible.

U.S. Pat. No. 5,051,007 (Maddox et al, 1991) provides a lubrication system for a centrifugal pump. The lubrication system includes a reservoir for holding a quantity of lubricant, structure for withdrawing lubricant from the reservoir, a stator, and a passageway for communicating lubricant from the reservoir to the bearing. In this design, there is a separate disk-like rotor fixed to the rotating shaft. This rotor rotates in a small oil reservoir and "pumps" lubricant to the bearings through the passageways. In the present invention, there is no "pumping" or "forcing" of the oil's progression. Rather, the present invention uses a rotor that rotates through the oil reservoir, where the oil's surface adhesion allows it to be carried up to above the bearing, where it is peeled from a rotating rotor and gravity-fed to the bearings.

U.S. Patent Application Pub. No. 20170102034 (Manabe et al.) discloses an oil-lubricated bearing device having a rolling bearing, a tapered member, a lubricant storage, and a contact portion. A lubricant scarping portion is formed at an inner peripheral surface of each of the pockets in the holder of the roller bearing and configured to scrap lubricant adhering to a surface of each of the rolling bodies. The holder also includes a second inclined surface formed at an outer peripheral surface of the holder adjacent to the outer ring side opening and rising with a slope toward the lubricant storage. In this design, the oil is stored in a material adjacent to the bearing and then "wicked" from the storage material into the bearing. There is no return of the used oil back to the storage material. In the present invention, there is no "wicking," and the used oil is returned to the reservoir at the base of the motor.

U.S. Patent Application Pub. No. 20190203727 (Perrino) provides a turbomolecular pump with a housing, a rotor shaft supported by a plurality of bearings, a deflector, a lubricant supply system, and a lubricant transfer device situated on the rotor shaft. The rolling bearing is disposed proximate to the lubricant transfer device, and the deflector is configured to deflect lubricant that passes through the rolling bearing outwardly with respect to the rotor shaft. In this design, the oil is contained within a separate reservoir and "wicked" from the reservoir by a fibrous component down into the bearing. There is no return of the used oil back to the reservoir. As noted above, the present invention does not involve any "wicking," and the used oil is returned to the based of the motor for re-use.

U.S. patent Ser. No. 10/312,766 (Pokorny, 2019) is my earlier patented design for a submersible-rated roller table motor. After observing the performance of this motor for several years, we were able to identify some shortcomings of this design. One disadvantage is that the previous design incorporated greased-for-life bearings rather than an oil lubrication system. Our experience with the earlier design has revealed that oil lubrication is far better for bearing lubrication than the standard maintenance greased or greased-for-life bearings. Greased-for-life bearings are reliant on the seals and the minimal lubrication held within the grease by the grease binder. Moreover, a sealed bearing runs hotter than an open bearing, which accelerates both the grease and seal degradation. Any contaminants that are present or enter a greased-for-life bearing are caught and do not have a chance to be flushed from the bearing.

The present invention incorporates a rotor-driven oil lubrication system that is maintenance-free and prolongs motor life. This rotor-driven lubrication system provides fresh oil flow to the bearing any time that the rotor/motor is operating, even at extremely low revolutions per minute (RPM). The present invention not only provides substantially more lubrication compared to the previous design but also allows the oil to flow in and out of the open bearings, thereby flushing out any contaminants. The oil flow also absorbs some of the bearing heat and moves it back to the main oil reservoir at the bottom of the motor housing as the oil flows out of the bearing into the oil reservoir.

In contrast to the prior art examples discussed above, it is an object of the present invention to provide a fully submersible motor in which the environment inside of the motor housing is completely separated from and controlled relative to the outside environment, thereby preventing moisture and/or dust solids from entering the motor housing and greatly increasing the life of the motor. It is a further object of the present invention to provide a motor in which the number of seals is minimized and air volume inside of the motor housing is maintained at a relatively constant level while air pressure is allowed to fluctuate. Yet another object of the present invention is to eliminate the need for an external source of compressed air; utilization of such systems makes installation more difficult, increases operating costs, and imposes additional maintenance requirements. Finally, it is an object of the present invention to implement certain improvements to my previously patented motor design, namely, to provide a rotor-driven bearing lubrication system that will last at least ten years and to reduce manufacturing costs. Further details and advantages of the present invention are discussed below.

BRIEF SUMMARY OF THE INVENTION

The present invention is a submersible-rated motor comprising: (a) a motor housing that is configured to enclose a stator and a rotor and to partially enclose a drive shaft, the motor housing comprising a drive end and a non-drive end; (b) a terminal plate assembly comprising a terminal box and a removable terminal cover, wherein the terminal box is cast directly onto the non-drive end of the motor housing, and wherein the terminal plate assembly is configured to receive one or more power conductors and to supply electrical power to the stator through a nonconductive terminal plate; (c) a combined seal/bearing housing situated at a front end of the motor housing and having a seal portion that extends forwardly from a center of the combined seal/bearing housing; (d) a rotating seal assembly, wherein the seal portion of the combined seal/bearing housing is configured to partially enclose the rotating seal assembly; (e) a drive-end oil peeler having a distal end, the distal end of the drive-end oil peeler being situated above a top of a proximal end of the rotor inside of the motor housing and configured to peel oil off of the top of the proximal end of the rotor while the rotor is rotating; (f) a non-drive-end oil peeler having a proximal end, the proximal end of the non-drive-end oil peeler being situated above a top of a distal end of the rotor inside of the motor housing and configured to peel oil off of the top of the distal end of the rotor while the rotor is rotating; (g) a first snap ring that is configured to secure the combined seal/bearing housing to the motor housing; (h) a first ball bearing that is situated inside of the combined seal/bearing housing on the drive shaft between the rotating seal assembly and the proximal end of the rotor; and (i) a second ball bearing that is situated inside of the motor housing on the drive shaft between the distal end of the rotor and the terminal plate assembly; wherein the rotating seal assembly comprises: a single, self-lubricating rotating seal; a seal spring; and a single-seal driver; wherein the rotating seal assembly is configured to rotate with the drive shaft; and wherein the seal spring is configured to apply axial load to the self-lubricating rotating seal.

In a preferred embodiment, a stationary seal face and a stationary seal O-ring are disposed on the drive shaft inside of the seal portion of the combined seal/bearing housing adjacent to a proximal end of the rotating seal assembly. Optionally, a bearing lock ring is situated on the drive shaft between the rotating seal assembly and the first ball bearing. The first ball bearing is preferably a double-row, angular contact bearing.

In a preferred embodiment, the present invention further comprises a second snap ring that is configured to secure the first ball bearing to an inside of the combined seal/bearing housing. The motor housing preferably comprises a plurality of radial fins that are configured to dissipate heat generated by the motor. In a preferred embodiment, the present invention further comprises a first oil plug that is situated at a front bottom end of the motor housing and is configured to allow oil to be drained from a main oil reservoir situated inside and at a bottom of the motor housing. Preferably, the first oil plug is magnetized.

In a preferred embodiment, the motor housing comprises a lifting eye that is situated in a center of a top part of the motor housing on an outside of the motor housing. Preferably, the drive shaft comprises a key that is situated on a proximal end of the drive shaft; and the drive shaft further comprises a stationary dust seat that is disposed on the drive shaft between the key and the seal portion of the combined seal/bearing housing.

In a preferred embodiment, the drive-end oil peeler comprises a redirector rib that is configured to direct oil that is peeled off of the rotor by the drive-end oil peeler through an oil feed hole in a first oil feed reservoir in the motor housing and into the first ball bearing, where the oil travels via gravity through the first ball bearing and into a main oil reservoir in a bottom of the motor housing. In another preferred embodiment, the non-drive-end oil peeler comprises a redirector rib that is configured to direct oil that is peeled off of the rotor by the non-drive-end oil peeler through an oil feed hole in a second oil feed reservoir in the motor housing and into the second ball bearing, where the oil travels via gravity through the second ball bearing and into a secondary oil reservoir in a bottom of the motor housing.

BRIEF DESCRIPTION OF THE DRAWINGS

FIG. 16 is a detail section view of the self-lubricating rotating seal of the rotating seal assembly.

REFERENCE NUMBERS

Figure 1:
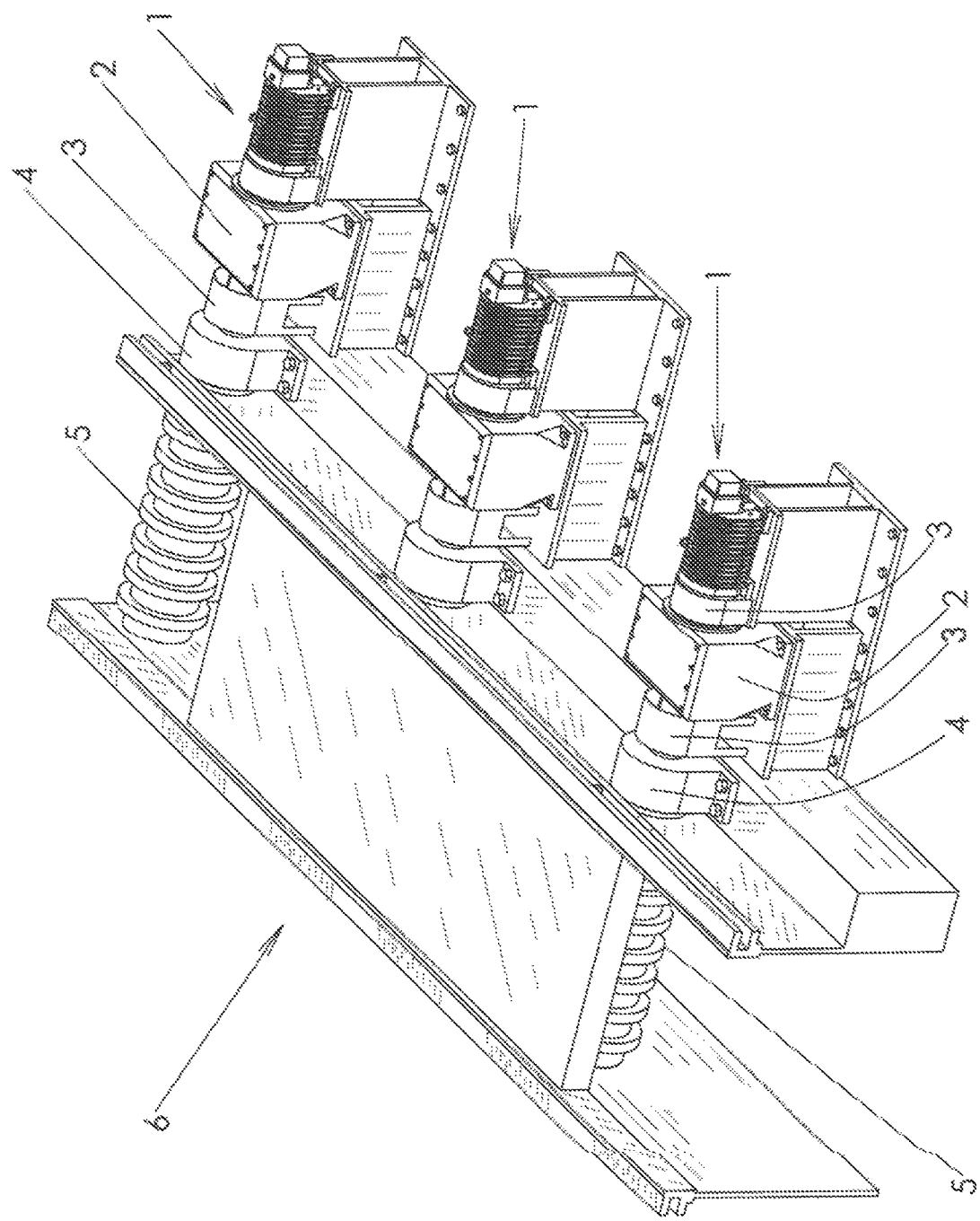
FIG. 1 is a perspective view of the present invention installed on a roller table.

1 Present invention (submersible-rated motor)
2 Gear box
3 Safety cover
4 Pillow block bearing
5 Roller (of roller table)
6 Roller table
7 Motor housing
7a Slot (in motor housing)
8 Drive shaft
8a Key (on drive shaft)
9 Combined seal/bearing housing
9b Seal portion (of combined seal/bearing housing)
10 Cooling fins (on motor housing)
11 First snap ring
12 First oil port plug
13 Foot
14 Lifting eye
15 Stator
16 [INTENTIONALLY OMITTED]
17 Stationary dust seal
18 Stationary seal face
18a Stationary seal O-ring
19 Rotating seal assembly
19a Self-lubricating rotating seal face
19b Seal spring
19c Single-seal driver
20 First ball bearing
20a Outer race (of first ball bearing)
20b Inner race (of first ball bearing)
20c Ball (of first ball bearing)
21 Second snap ring
22 Drive-end oil peeler
22a Redirector rib
22b Riser block
23 Terminal plate assembly
23a Terminal cover
24 Rotor
24a Radial fins (of rotor)
25 Opposite-drive-end oil peeler
25a Redirector rib
26 Second oil port plug
27 Second bull bearing
27a Outer race (of second ball bearing)
27b Inner race (of second ball bearing)
27c Ball (of second ball bearing)
28 Screw
29 Bearing lock ring
30 Third oil port plug
31 Main oil reservoir
32 First oil feed reservoir
33 First oil feed hole
34 Secondary oil reservoir
35 Second oil feed hole
36 Passageway
37 Second oil feed reservoir Note: Reference number 2-6 are not part of the present invention and are shown only for environmental purposes.

DETAILED DESCRIPTION OF INVENTION

Through a series of tests conducted on oil-bath lubricated motors with varying oil levels, it was discovered that, with a relatively low oil level (midway up the rotor tins) and with the motor running at a relatively low RPM, a layer of oil would naturally form on the outer diameter of the rotating rotor and travel through complete revolutions. Next, we increased the RPM to verify that this layer of oil was still observed, and we checked the motor at cold and hot operating temperatures to account for viscosity changes. The naturally forming layer of oil on the outer diameter of the rotor was observed at the higher RPM and even when the shaft was turned by hand. This observation led us to formulate the idea of using the motor's rotating rotor to transfer the oil to a location above the bearings, where it could be collected and then funneled down into the bearings to provide lubrication.

The next challenge was to develop a functional process for collecting the oil from the rotating rotor and feeding it to the bearings. This operation had to work for both clockwise and counterclockwise rotation because the motor install rotation requirement may vary. We also wanted to ensure that the system would feed oil to the bearings at high RPMs and hand-turning speed. The solution we devised is the oil peeler, which is a key component of the present invention. The oil peeler of the present invention is non-contact (i.e., it does not come into contact with the rotating rotor) and configured to peel oil off the surface of the rotating rotor and feed it to an oil journal, which allows the oil to flow down to the back side of the bearing. From there, the oil is forced to flow through the open bearing and back down to the bottom of the motor housing. Through further testing, we were able to optimize the clearance between the oil peeler and the rotor, as well as the length of the oil peeler.

In order to reduce manufacturing costs, we incorporated a single-face se-lubricating seal without an oil bath. The incorporation of this feature simplified the motor build and reduces manufacturing costs by eliminating a machined housing, housing casting, seal oil, O-ring and pipe plug, and it also allowed us to move from a standard double-seal arrangement to a single-face self-lubricating seal, all while maintaining the fully sealed motor that our customers require. The structural details of the present invention are discussed more fully below.

FIG. 1 is a perspective view of the present invention installed on a roller table. As shown in this figure, the motors 1 are installed on the side of the roller table with a gear box 2 in between the motor 1 and roller table. The drive shaft (not shown) extends from the motor 1 into the gear box 2, under a safety cover 3 that surrounds a coupler (not shown), and into a pillow block bearing 4. The drive shaft is mechanically coupled to the rollers S that comprise the roller table 6. Each motor shares the same central lateral axis as the roller 5 to which it is mechanically connected. Although the present invention is shown here in connection with a roller table, application of the present invention is not limited to such use. The present invention may be modified for use in any application in which a submersible-rated motor is needed. Furthermore, the present invention is not limited to the particular table mount configuration shown in FIG. 1; some configurations, for example, will not include the gear box 2.

Figure 2:
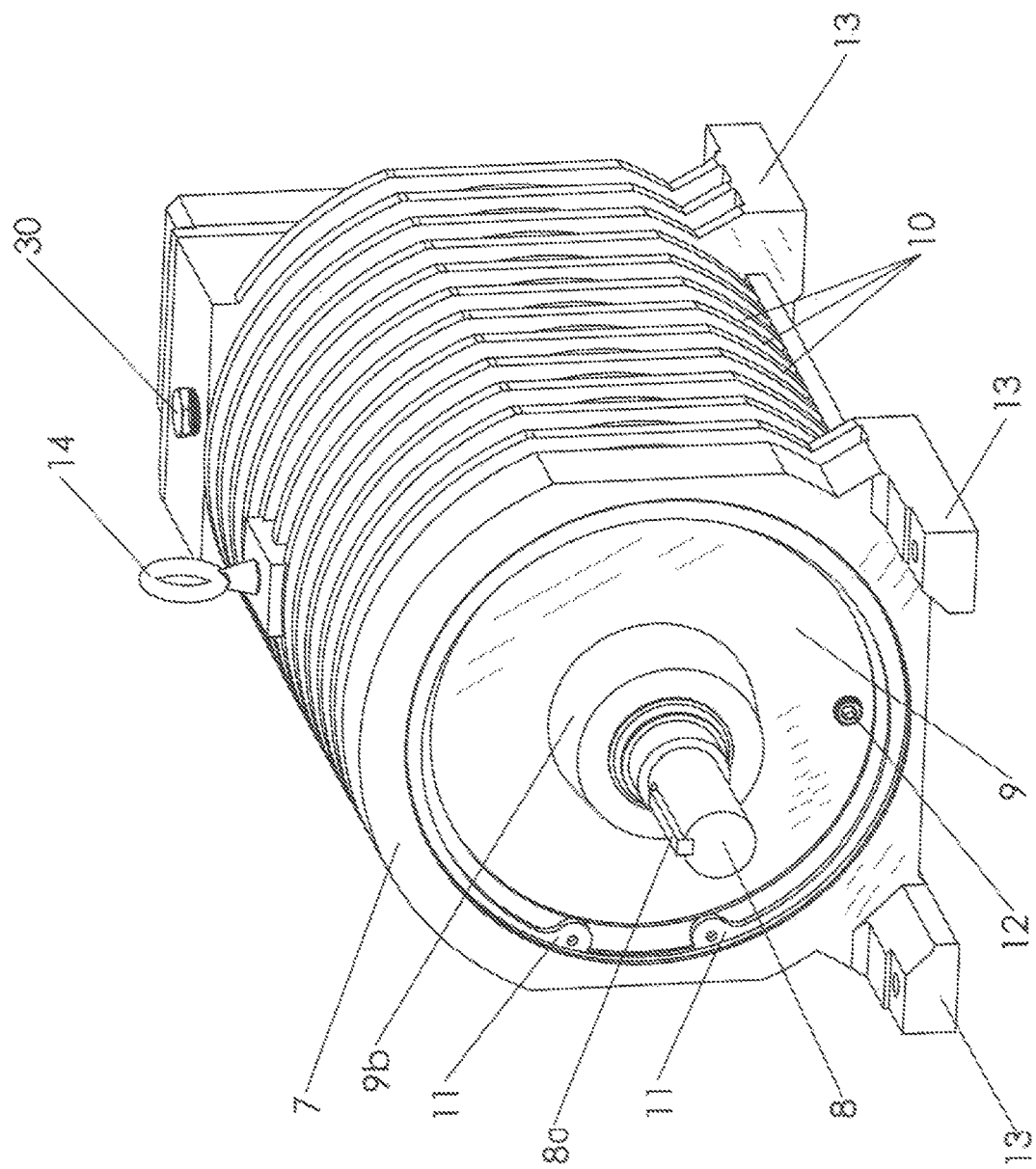
FIG. 2 is a front perspective view of the present invention.

FIG. 2 is a front perspective view of the present invention. As shown in this figure, the present invention 1 comprises: a motor housing 7 that encloses the rotor and stator (not shown); a drive shaft 8 that is driven by the rotor; and a combined seal/bearing housing 9, part of which encloses a single-face self-lubricating seal (see FIG. 10). The motor housing 7 preferably comprises a plurality of radial or "cooling" fins 10 that act to dissipate heat generated by the motor. As noted above, the drive shaft 8 extends into the gear box 2 (see FIG. 1). A first snap ring 11 secures the seal/bearing housing 9 to the motor housing 7, and a first oil port plug 12 serves two purposes. First, it allows the oil to be drained from either end of the motor. Second, the first oil port plug 12 is preferably magnetized, thereby collecting metal particles from within the oil inside of the motor.

The invention preferably comprises four feet 13 situated at the corners of the motor housing 7 that attach to the tables shown in FIG. 1. The feet 13 are preferably integral to the motor housing 7; that is, the feet and motor housing are cast together as a single part. The feet are optional and would be required for the mounting shown in FIG. 1; however, the feet could also be omitted and the motor 1 installed as shown in FIG. 1 of the '766 patent. The first snap ring 11 is held in place via a slot 7a at the frontal end of the motor housing 7 (see FIG. 10). Note that the motor housing 7 preferably comprise a lifting eye 14 that is situated in the center of the top part of the housing on the outside of the housing.

Figure 3:
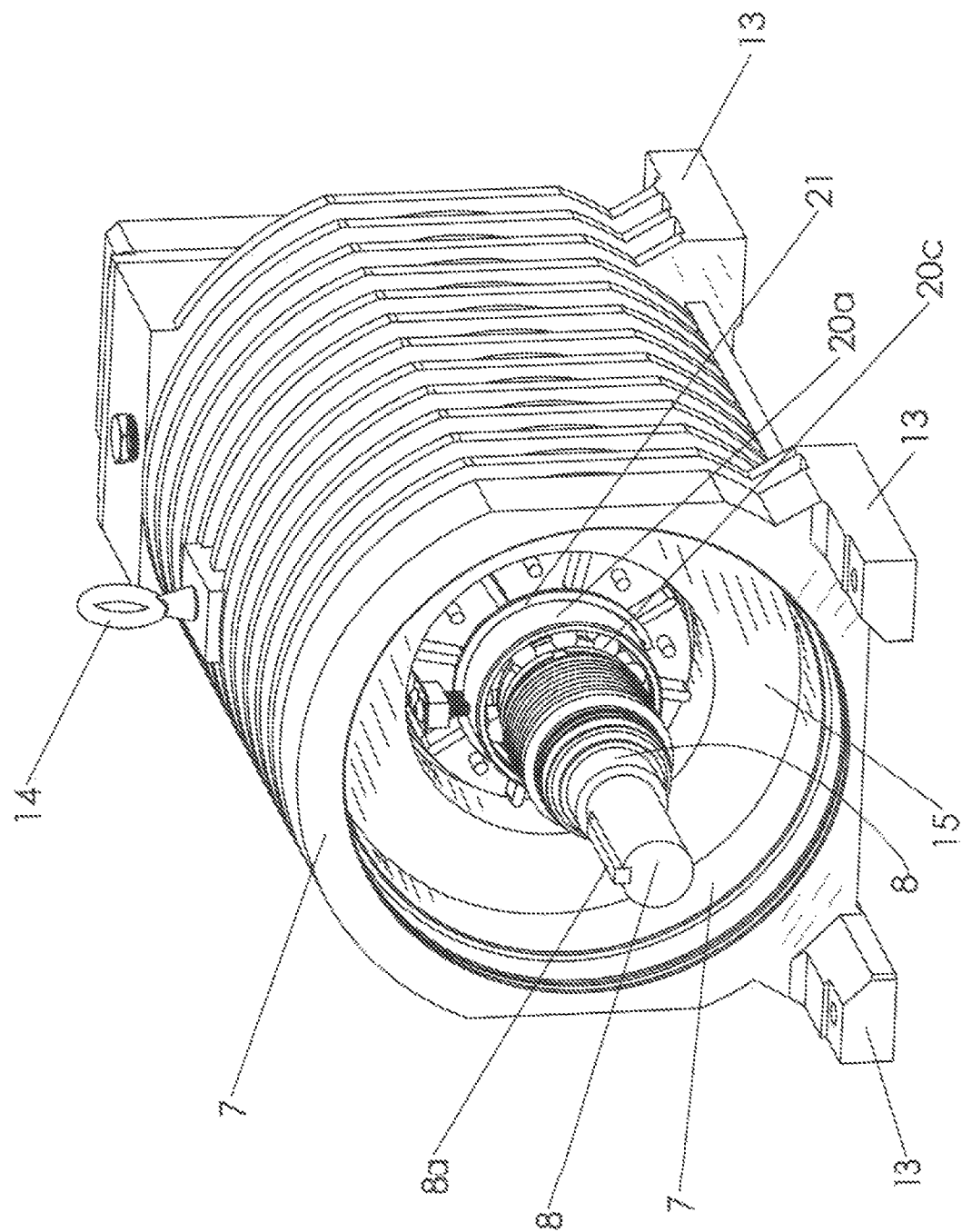
FIG. 3 is the same view as FIG. 2, except that the seal/bearing housing, snap ring, and first oil port plug have been removed.

FIG. 3 is the same view as FIG. 2, except that the seal/bearing housing, first snap ring, and first oil port plug have been removed. This figure shows the stator 15, which is situated within the motor housing 7. The drive shaft 8 comprises a key 8a, which allows the drive shaft 8 to be coupled to a drive shaft in the gear box 2. An optional stationary dust seal 17 is disposed on the drive shaft near the proximal end of the shaft (the proximal end being the end that comprises the key 8a). Next, a stationary seat face 18 and accompanying O-ring 18a are disposed on the drive shaft. This O-ring seals the stationary seal face 18 to the seal portion 9b of the combined seal % bearing housing 9. Next, a rotating seal assembly 19 is disposed about the drive shaft 8. This rotating seal assembly 19 is discussed more fully below. FIG. 3 also shows the first ball bearing 20, which is situated directly behind the rotating seal assembly 19. The first ball bearing 20 has an outer race 20a, an inner race 20b, and a plurality of balls 20c situated in between the inner and outer races. Behind the first ball bearing 20 on the drive shaft 8 is a second snap ring 21, which secures the first ball bearing 20 to the inside of the combined seal/bearing housing 9.

Figure 4:
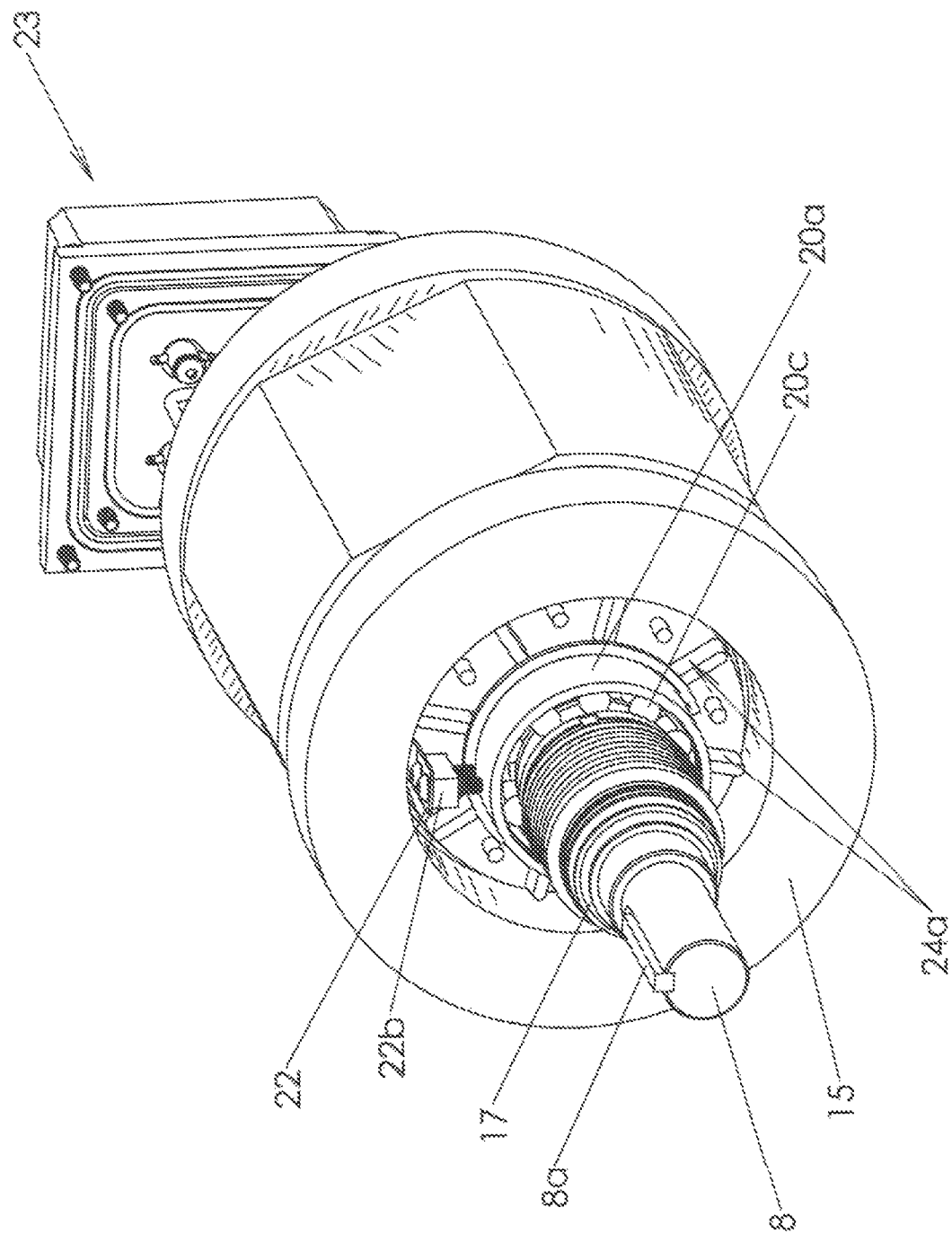
FIG. 4 is the same view as FIG. 3, except that the motor housing has been removed.

FIG. 4 is the same view as FIG. 3, except that the motor housing has been removed. As shown in this figure, the drive-end oil peeler 22 is situated so that the distal end (that is, the end closest to the terminal plate assembly 23) of the drive-end oil peeler 22 is situated just above the top of the proximal end of the rotor 24. The rotor 24 preferably comprises radial fins 24a on either end of the rotor; these fins serve to create turbulence as the rotor 24 rotates, thereby dissipating heat.

Figure 5:
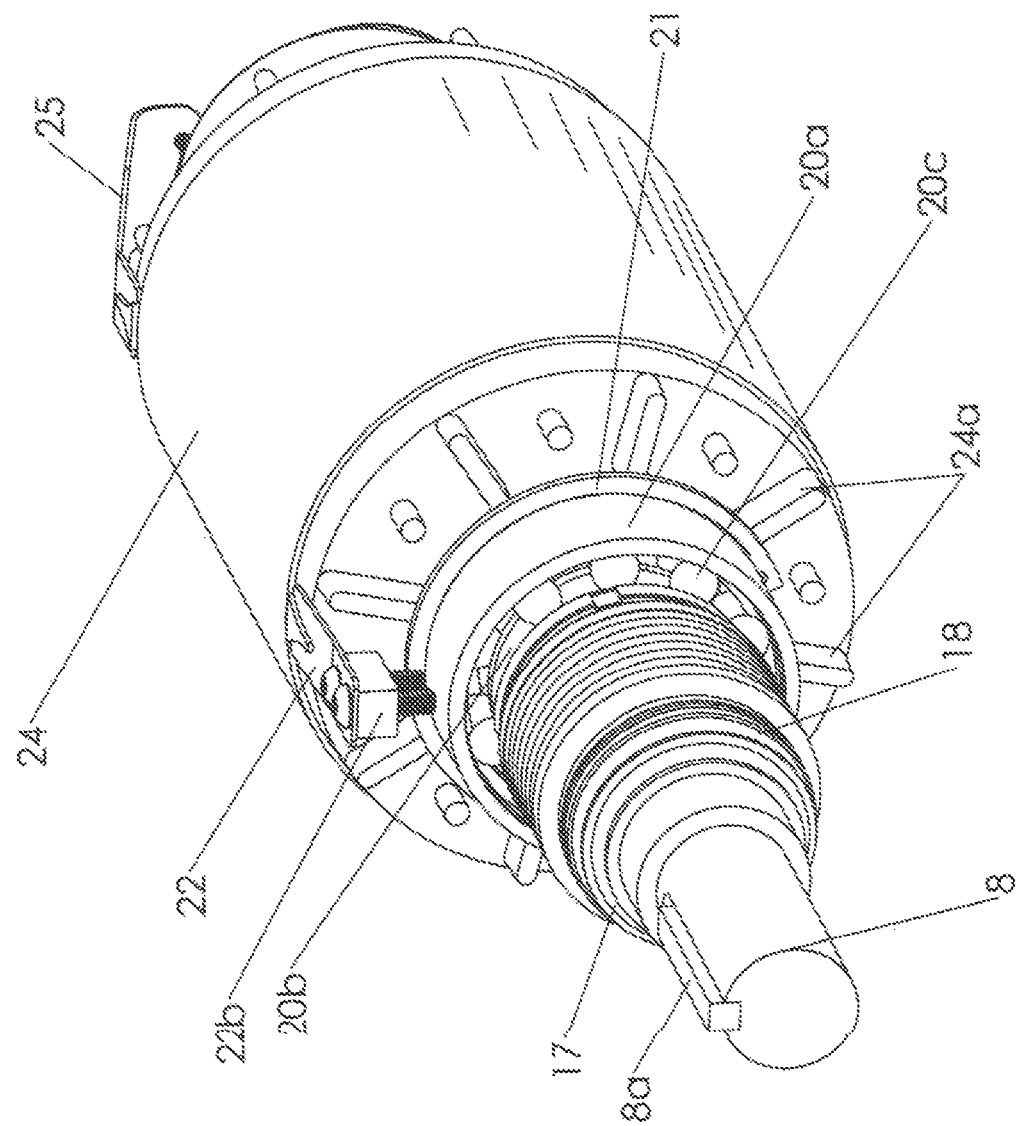
FIG. 5 is the same view as FIG. 4, except that the stator and terminal plate assembly have been removed.

FIG. 5 is the same view as FIG. 4, except that the stator and terminal plate assembly have been removed. This figure also shows the opposite-drive-end oil peeler 25, which is situated so that the proximal end (that is, the end closest to the key 8a) of the opposite-drive-end oil peeler 25 is situated just above the distal end of the rotor 24. The drive-end oil peeler 22 and the opposite-drive-end oil peeler 25 are discussed more fully below in connection with FIGS. 12 and 14. As used herein, the terms "opposite-drive-end" and "non-drive-end" are synonymous.

Figure 6:
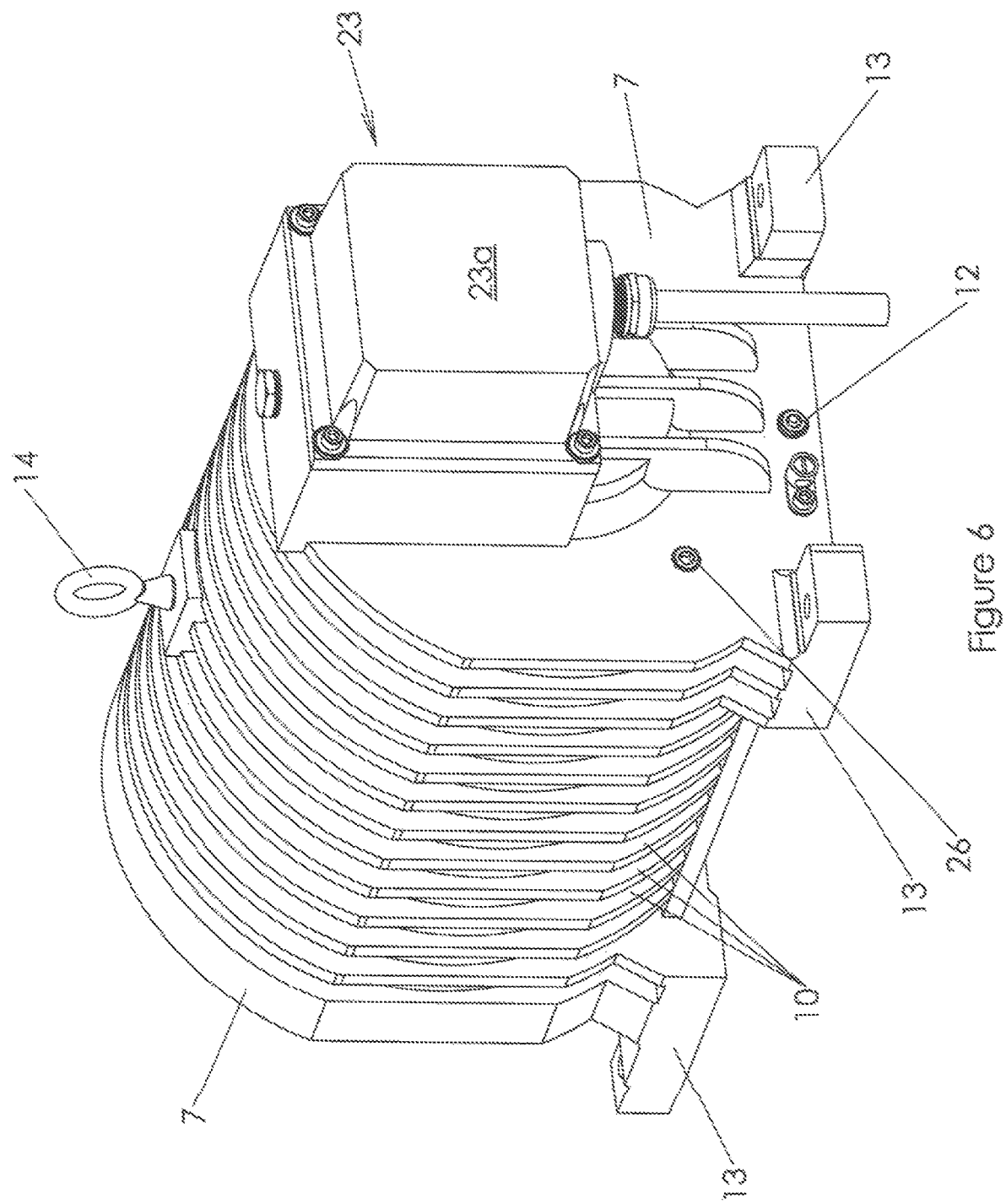
FIG. 6 is a rear perspective view of the present invention.

FIG. 6 is a rear perspective view of the present invention. This figure shows the terminal plate assembly 23, which is identical to that described in connection with the '766 patent. This figure also shows the second oil port plug 26, which is situated partway up the motor housing 7 at the rear end of the motor 1. The purpose of the first oil port plugs 12 is to allow oil to be drained from within the motor housing 7, if necessary. The second oil port plug 26 is used to set the correct oil level within the motor housing 7.

Figure 7:
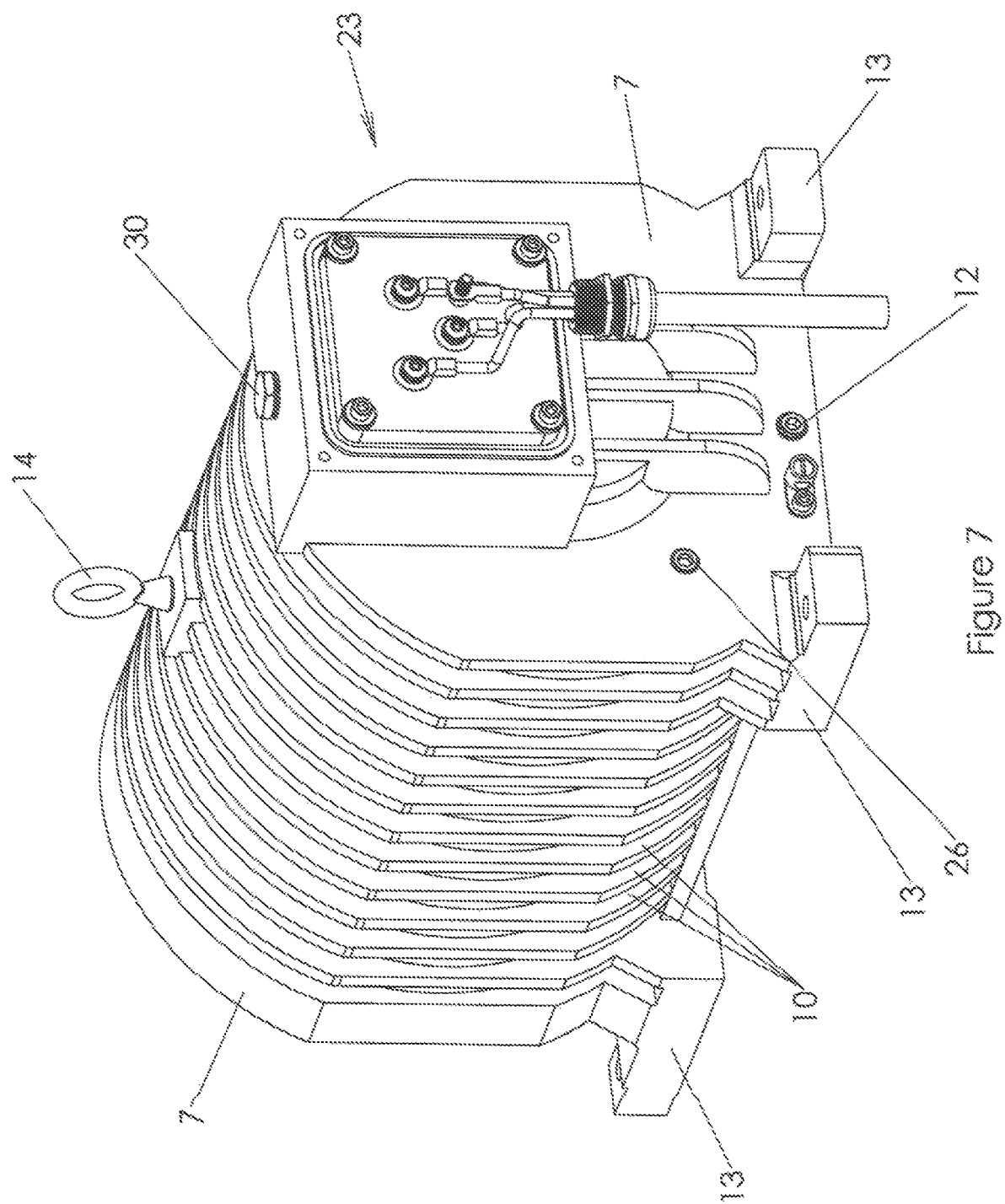
FIG. 7 is a rear perspective view of the present invention shown with the terminal cover removed.
Figure 8:
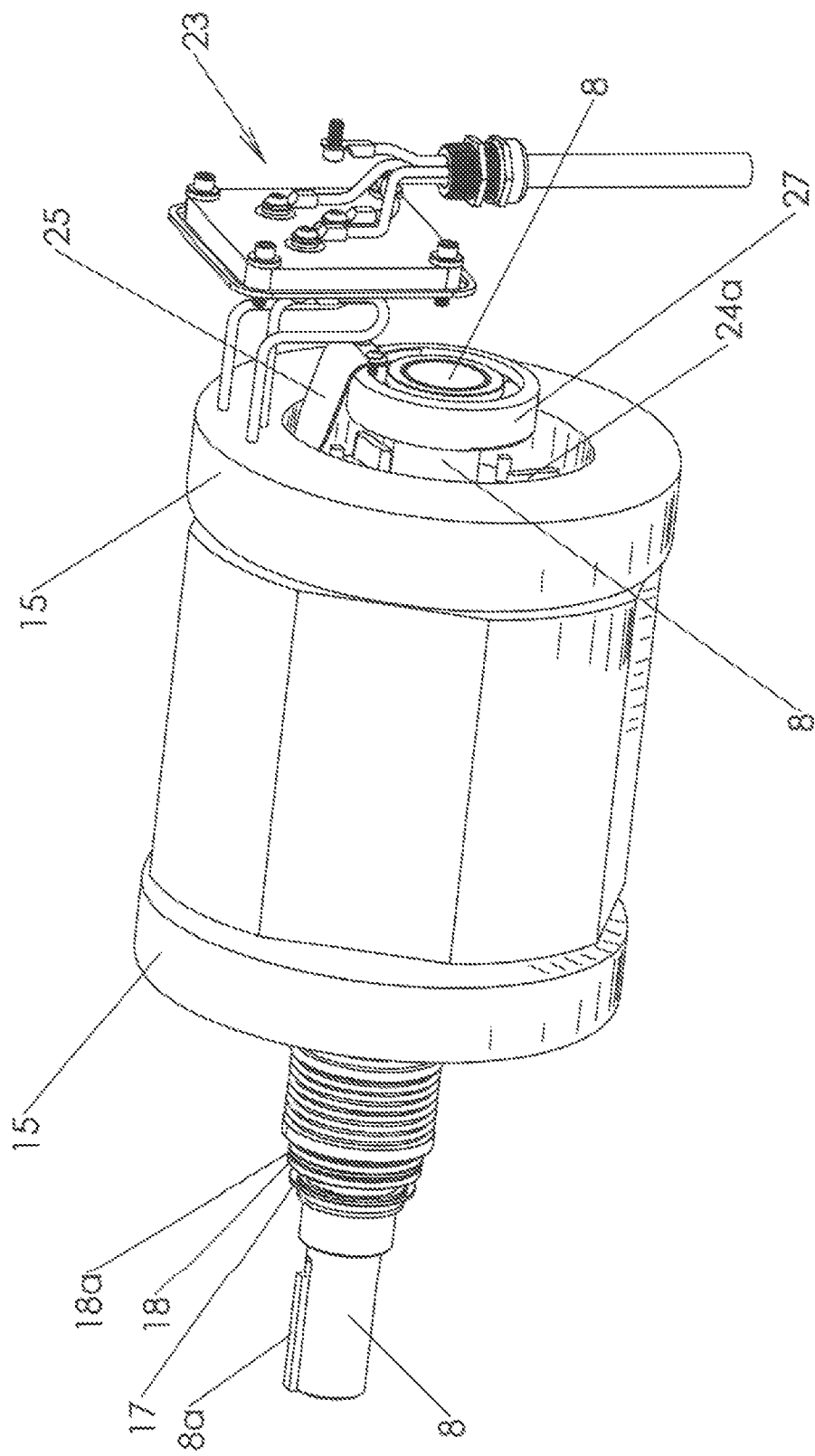
FIG. 8 is a rear perspective view of the present invention with the same parts removed as in FIG. 4.

FIG. 7 is a rear perspective view of the present invention shown with the terminal cover removed. The terminal cover 23a is shown in FIG. 6.) FIG. 8 is a rear perspective view of the present invention with the same parts removed as in FIG. 4. Details of the terminal plate assembly 23 are provided in the '766 potent and incorporated herein by reference. This figure shows the opposite-drive-end oil peeler 25, as well as the second ball bearing 27, which is situated on the terminal (or distal) end of the drive shaft 8 and which has an outer race 27a, an inner race 27b, and a plurality of balls 27c. The terminal end of the opposite-drive-end oil peeler 25 is secured to the motor housing 7 (omitted in this figure) with screws 28.

Figure 9:
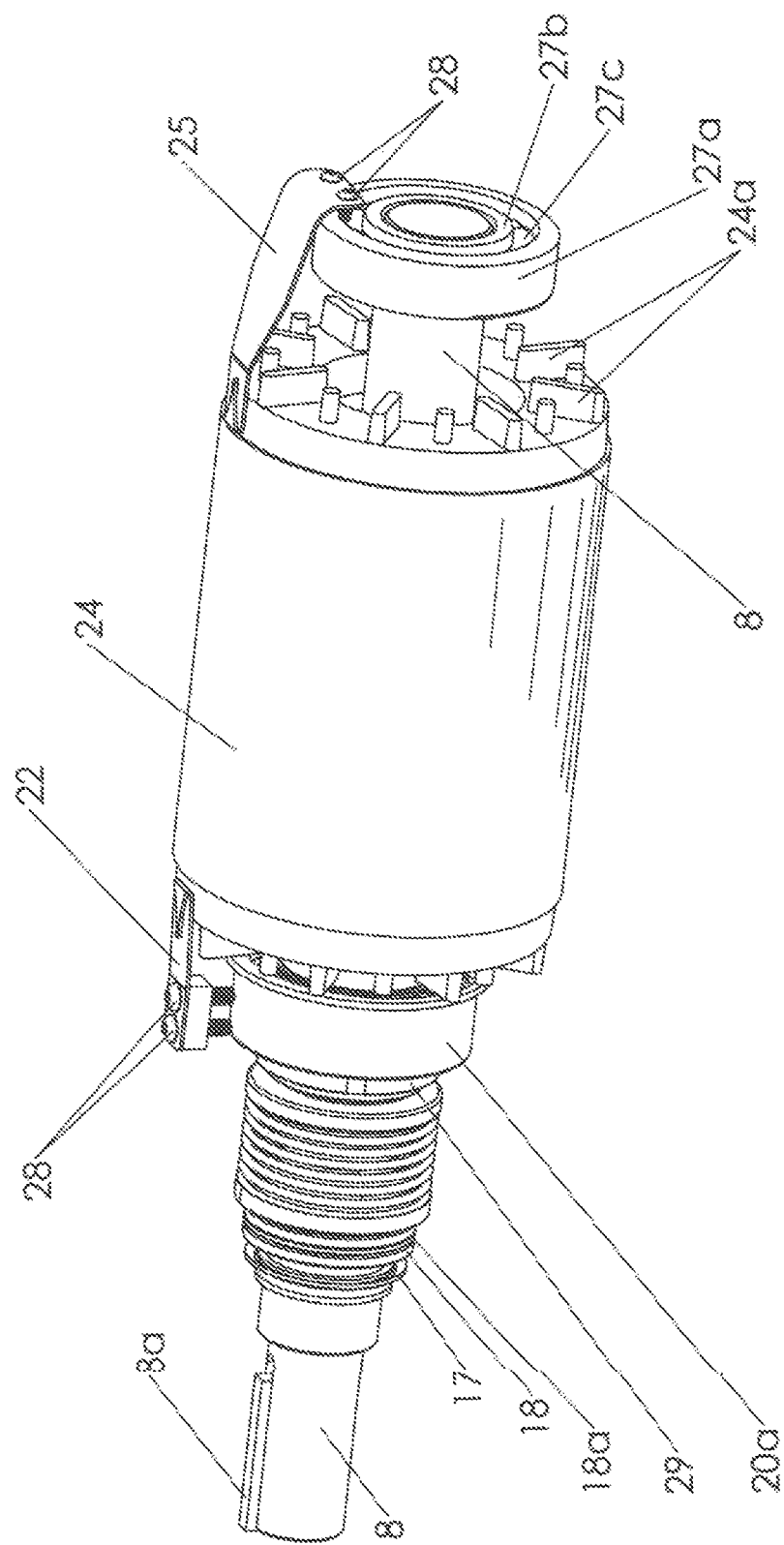
FIG. 9 is the same view as FIG. 8, except that the stator and terminal plate assembly have been removed.

FIG. 9 is the same as the view shown in FIG. 8, except that the stator and terminal plate assembly have been removed. This figure clearly shows the orientation of the drive-end oil peeler 22 and the opposite-drive-end oil peeler 25 in relation to the rotor 24. It also shows the first and second ball bearings 20, 27, which are situated on either end of the rotor 24.

Figure 10:
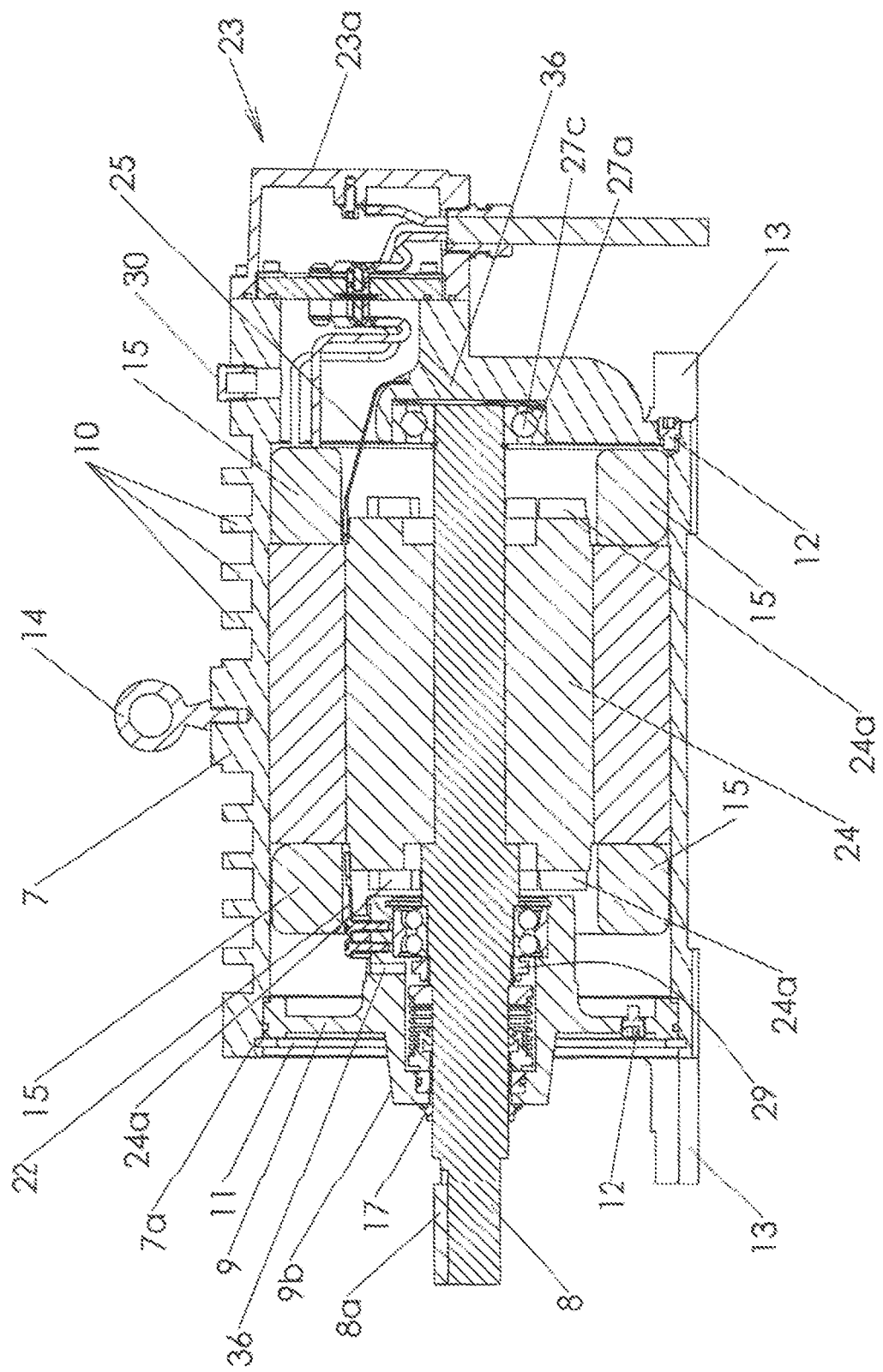
FIG. 10 is a section view of the present invention.

FIG. 10 is a section view of the present invention. As shown in this figure, the stationary dust seal 17 is situated on the outside of the combined seal/bearing housing 9 on the proximal end of the motor. The rotating seal assembly 19 is situated on the drive shaft 8 inside of the proximal end of the combined seal/bearing housing 9. An optional bearing lock ring 29 is situated between the rotating seal assembly 19 and the first ball bearing 20. The purpose of the bearing lock ring 29 is to prevent the ball bearing 20 from becoming loose on the drive shaft 8. On the rear (terminal or distal) end of the motor, the second ball bearing 27 receives the terminal end of the drive shaft 8. A third oil port plug 30 is situated on top of the motor housing 7 and may be used to pour bearing lubrication oil into the housing. As shown in this figure, the drive-end oil peeler 22 is angled downwardly so that the oil that is peeled off of the proximal end of the rotor 24 will flow into the first ball bearing 20 (see FIG. 11). Similarly, the opposite-drive-end oil peeler is angled downwardly so that the oil that is peeled off of the distal end of the rotor 24 will flow into the second ball bearing 27 (see FIG. 13). Note that the first ball bearing 20 is a double-row, angular-contact bearing, which allows the drive shaft 8 to take load axially.

Figure 11:
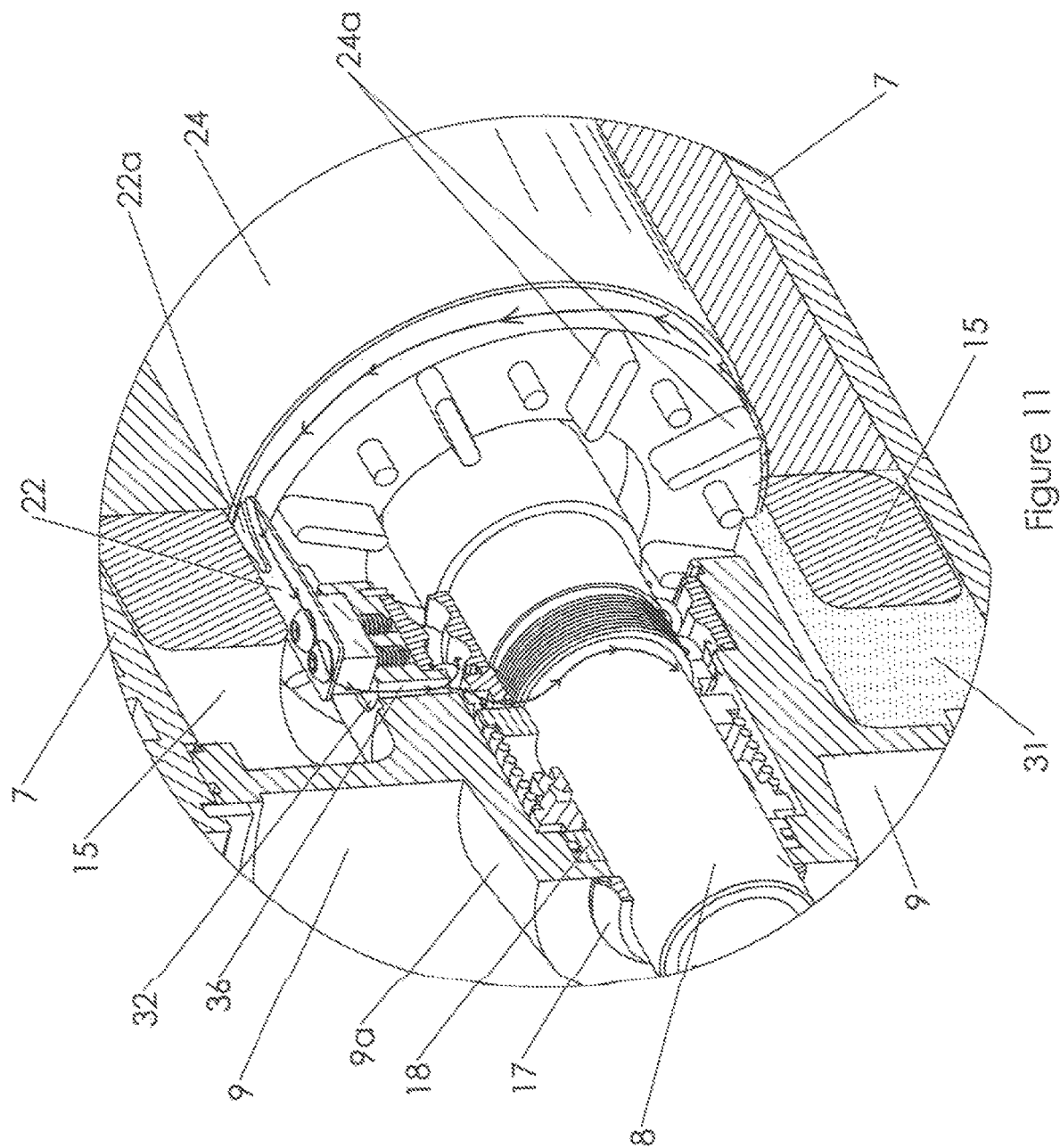
FIG. 11 is a partial cutaway/section view of the present invention illustrating the oil flow on the drive end of the motor.

FIG. 11 is a partial cutaway/section view of the present invention illustrating the oil flow on the drive end of the motor. The arrows in this figure indicate the direction in which the oil is flowing when the rotor is rotating in a counter-clockwise direction. As noted above, neither the drive-end oil peeler 22 nor the opposite-drive-end oil peeler 25 comes into contact with the rotor 24. Rather, both oil peelers 22, 25 are positioned just above the proximal and distal ends of the rotor 24, respectively, at a 12 o'clock position relative to the rotor. Typically, each oil peeler would be positioned at 0.050-0.060 inches of clearance from the rotor. As the rotor 24 rotates, an oil film is pushed up onto the oil peeler, and the oil is peeled off of the rotor as it passes the oil peeler (this is true of both oil peelers). Both oil peelers 22, 25 are bi-directional, which means that they will provide lubrication to the ball bearings 20, 27 regardless of the direction in which the rotor 24 is rotating. Once the oil has been peeled from the rotor 24, the rotor continues to rotate back down to the bottom of the motor housing (6 o'clock position), where a new film of oil is applied to the rotor 24 as it travels through the main oil reservoir 31.

As shown in FIG. 11, the drive-end oil peeler 22 comprises a redirector rib 22a, which forces the oil to travel into the first oil feed reservoir 32, where it passes via gravity through a first oil feed hole 33. The first oil feed reservoir 32 is situated above the first ball bearing 20 between the proximal end of the stator 15 and the inside of the combined seal/bearing housing 9 (see also FIG. 12). The drive-end oil peeler 22 is secured to the combined seal/bearing housing 9 with screws 28. After the oil travels through the first oil feed hole 33, it passes through the open ball bearing 20, thereby lubricating the bearing as it rotates. Next, gravity causes the oil to exit the ball bearing 20 and to flow back to the main oil reservoir 31 at the bottom of the motor housing 7.

Figure 12:
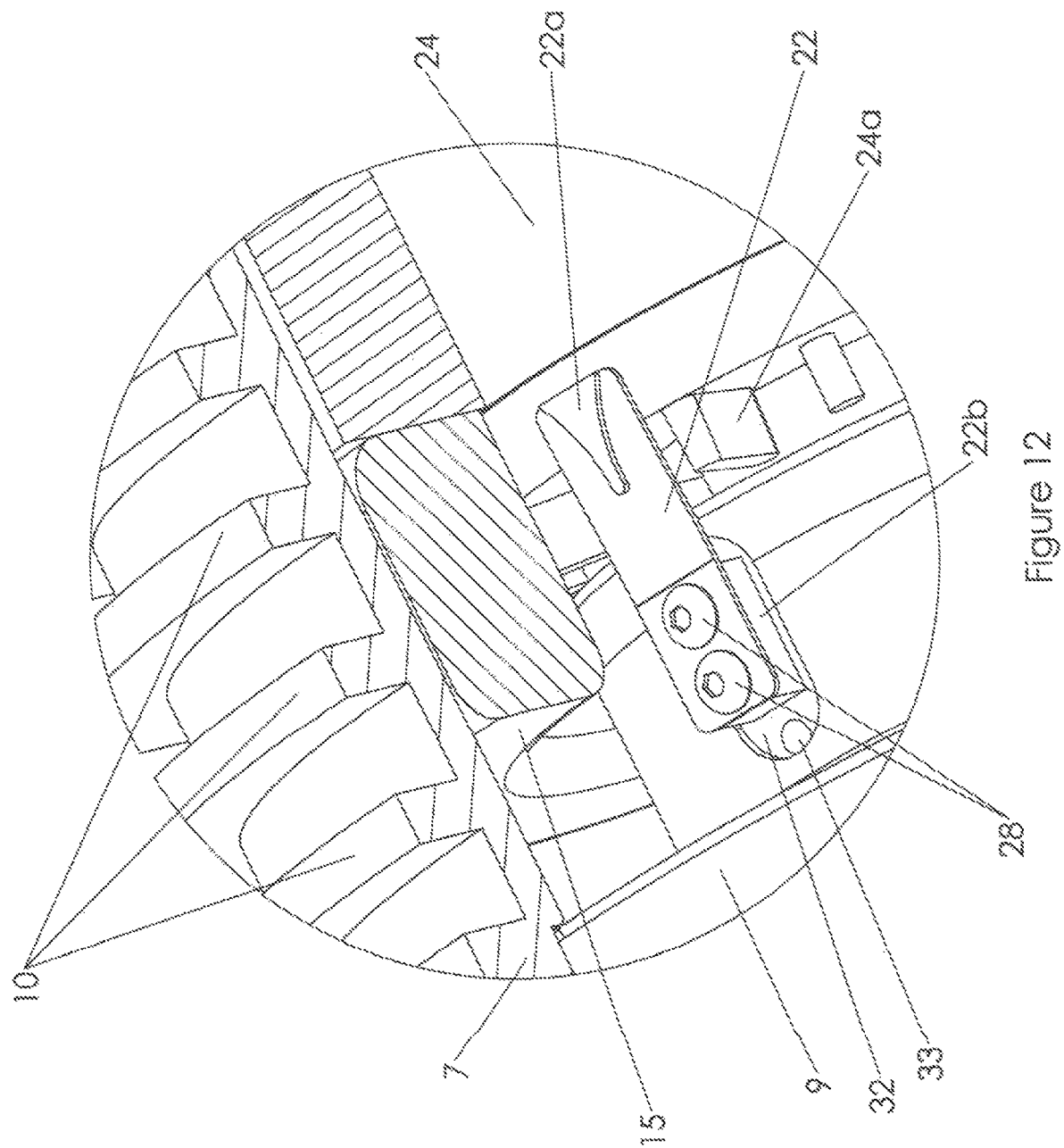
FIG. 12 is a detail view of the drive-end oil peeler.

FIG. 12 is a detail view of the drive-end oil peeler. As shown in this figure, the first oil feed reservoir 32 is a shallow cavity in the combined seal/bearing housing 9. A riser block 22b within this cavity and provides support for the drive-end oil peeler 22.

Figure 13:
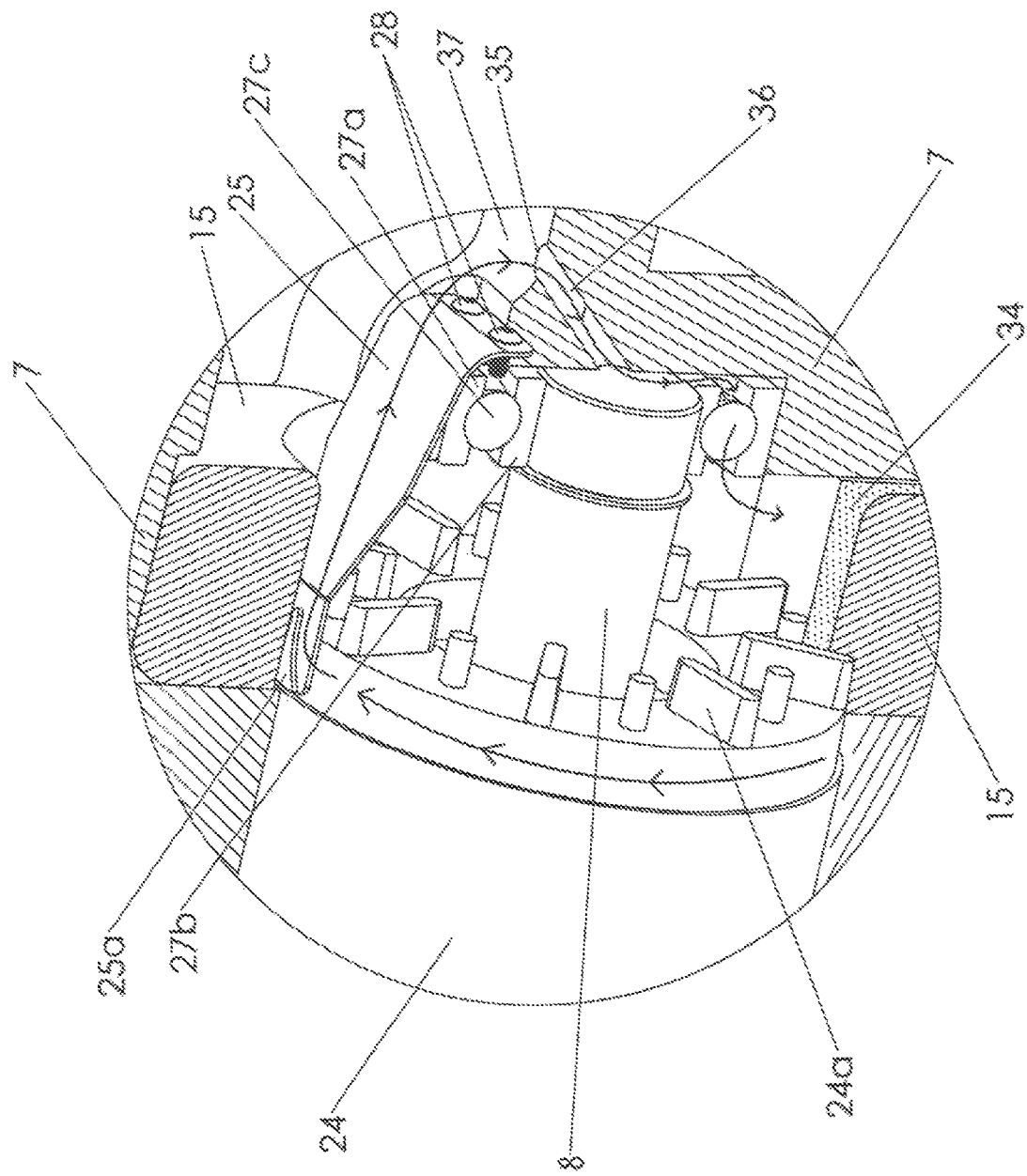
FIG. 13 is a partial cutaway/section view of the present invention illustrating the oil flow on the opposite-drive end of the motor.

FIG. 13 is a partial cutaway/section view of the present invention illustrating the oil flow on the opposite-drive end of the motor. As shown in this figure, as the rotor 24 rotates, is ricks up oil that is contained in a secondary oil reservoir 34 that is situated within the motor housing 7 at the bottom of the motor housing and at the distal end of the motor housing. The secondary oil reservoir 34 is configured so that the distal end of the rotor 24 will pass through it as the rotor rotates. (Similarly, as explained above, the main oil reservoir 31 is configured so that the proximal end of the rotor 24 will pass through it as the rotor rotates. In a preferred embodiment, the main and secondary oil reservoirs are in fluid communication with one another so that the oil may flow freely from one reservoir to the other.) The oil is peeled off of the rotor 24 by the opposite-drive-end oil peeler 25, and the redirector rib 25a on the opposite-drive-end oil peeler 25 directs the oil to a second oil feed hole 35, which is in fluid communication with a passageway 36 in the motor housing 7 that directs the oil to the second ball bearing 27, where the oil will flow by gravity to the bottom of the oil bearing and then out through the ball bearing and back into the secondary oil reservoir 34. Note that the secondary oil reservoir 34 is not as large as the main oil reservoir 31 because the second ball bearing 27 is only a single-row ball bearing and, therefore, requires less lubrication than the first ball bearing 20.

Figure 14:
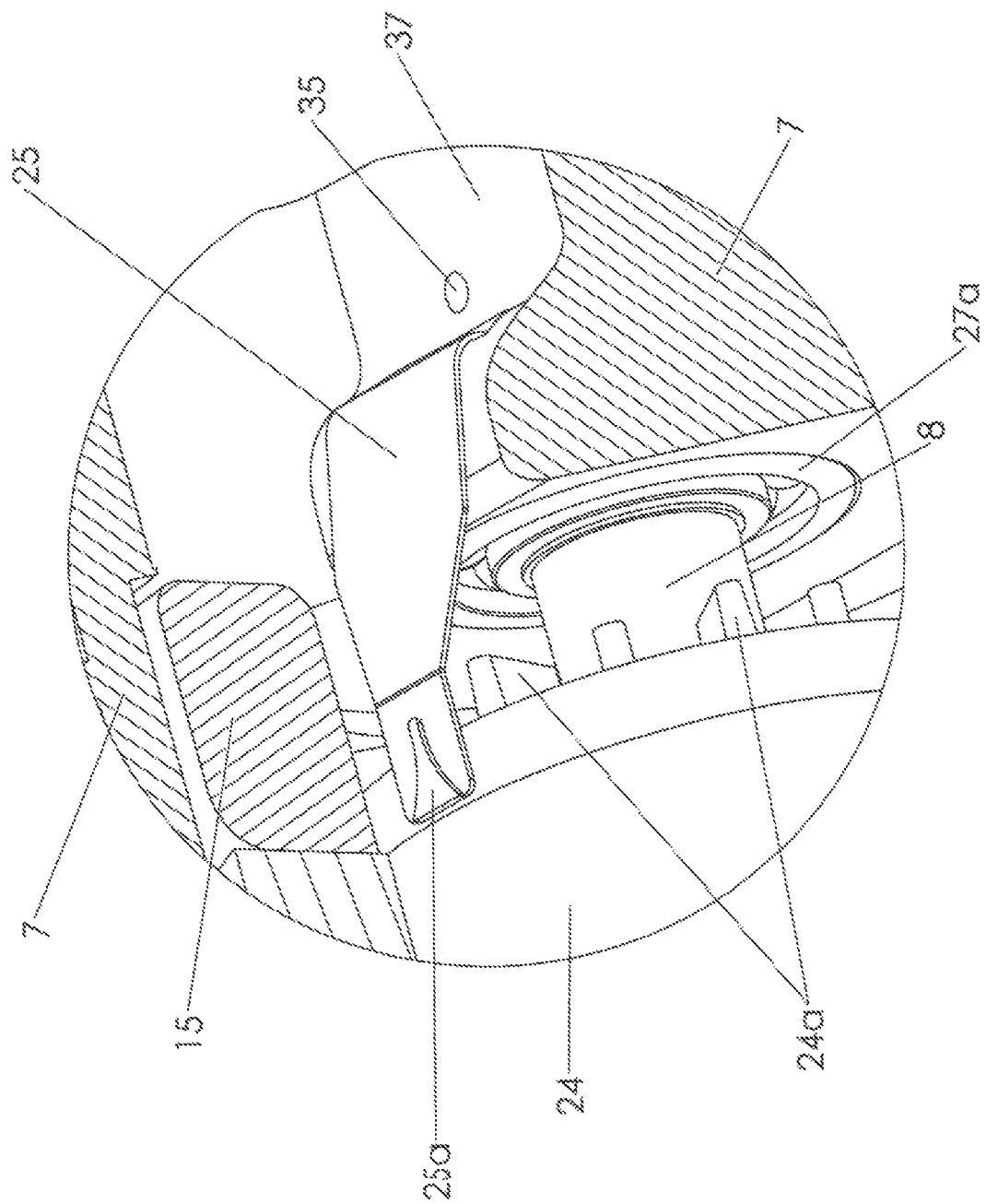
FIG. 14 is a detail view of the opposite-drive-end oil peeler.

FIG. 14 is a detail view of the opposite-drive-end oil peeler. As shown in this figure, the oil that is peeled off of the rotor 24 by the opposite-drive-end oil peeler 25 is directed by the oil peeler 25 into a second oil feed reservoir 37 that is formed by the motor housing 7 and situated at the terminal end of the opposite-drive-end oil peeler 25. The second oil feed hole 35 is located on the floor of the second oil feed reservoir 37 (just as the first oil feed hole 33 is located on the floor of the first oil feed reservoir 32). The redirector ribs 22a, 25a are configured so that they lie directly above the proximal and distal ends of the rotor 24, respectively, and each peeler is angled downwardly away from the redirector rib and toward the oil feed hole 33, 35.

Figure 15:
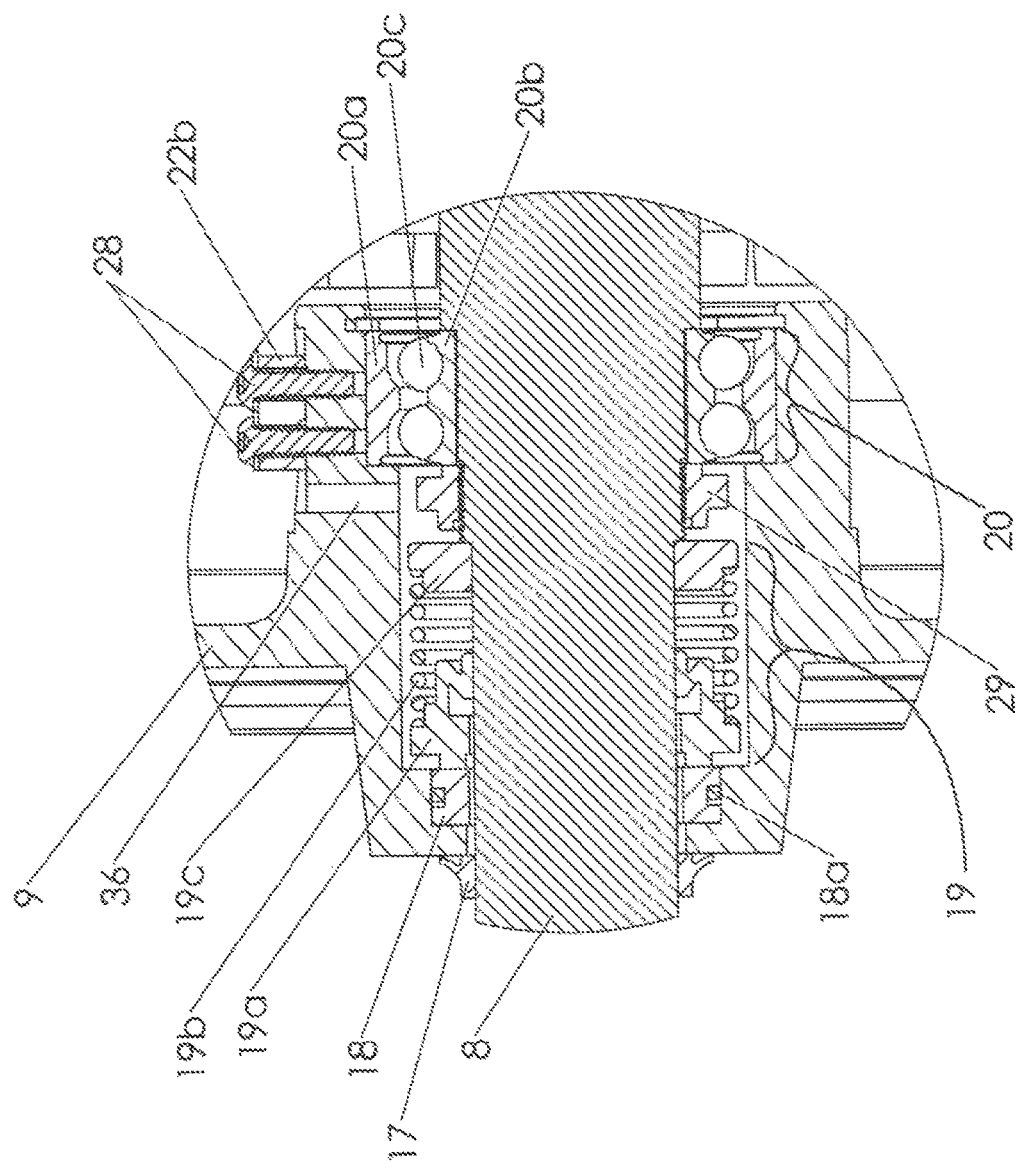
FIG. 15 is a section view of the rotating seal assembly.

FIG. 15 is a detail section view of the rotating seal assembly. As shown in this figure, the rotating seal assembly 19 is comprised of a single, self-lubricating rotating seal 19a, a seal spring 19b, and a single-seal driver 19c. These parts are arranged in this order, from proximal to distal on the drive shaft 8. All three of these parts are configured to rotate with the drive shaft 8. The seal spring 19b is configured to apply axial load to the self-lubricating rotating seal 19a. The self-lubricating rotating seal 19a is preferably a rubber bellows design (see FIG. 16); this design causes the self-lubricating rotating seal 19a to grip the drive shaft 8.

The present invention has several advantages over the prior art. The rotor-driven oil lubrication system of the present invention has no wear items. There are no seals that wear as in a greased-for-life bearing. The oil peeler of the present invention is non-contact and bi-directional. The oil in the main reservoir is equivalent to hundreds of times the actual lubrication that is found in a greased or greased-for-life bearing.

With oil lubrication, there is less torque required during a colder application startup. Grease solidifies when it gets cold, for example, when the steel mill is down for a shift during winter months. On startup, the grease in the greased-for-life bearing is solid, and the bearing balls often skid in the bearing races for a period of time until the grease heats up sufficiently to allow the lubrication to exit the grease binder and provide lubrication. Bearing damage is caused, however, when the bearing balls skid. With oil lubrication, the oil is always liquid and instantly provides a lubrication film on cold startup applications.

With the present invention, there is only one moving part, which is the rotor. Other oil lubrication systems may use an additional oil pumping system or other accessories that are required to move in addition to the motor, all of which decrease reliability and increase cost and complexity. With the present invention, as long as the motor shaft/rotor is turning, oil is being provided to the bearings. No further pumping systems or accessories are required.

The single-face mechanical seal design of the present invention is an effective and reliable design for sealing a drive shaft that rotates but otherwise is stationary. Other motors use standard lip seals, or a series of lip seals, to seal the shaft. These lip seals are wear items that are subject to accelerated wear due to the abrasive steel dust solids found in the steel mill rollout/runout application.

Finally, the snap ring used to fix the combination housing of the present invention is better than other designs because of its simplicity and fool-proof engagement. When the typical bolt pattern is used, there is room for loosening and over- or under-torquing. With the snap ring, there are fewer parts to manage during assembly and inventory and, therefore, less machine time setup required. The snap ring reduces the exterior diameter of the motor, providing a more compact motor design, whereas a bolt pattern requires a larger housing diameter to accommodate the washer and the housing flange. Furthermore, the snap ring requires a specific tool to remove it, thereby adding an extra level of security for the motor.

In sum, the present invention has several structural advantages over the prior art. First, it provides a truly sealed motor enclosure that encompasses a clean main oil reservoir. Second, the rotor is configured to rotate through oil reservoirs at the front and the back of the motor. Third, it incorporates non-contact oil peelers at the front and back ends of the rotor and an oil-peeler riser block on the drive-end oil peeler. Fourth, it includes two oil feed reservoirs at the front and back ends of the rotor, above the ball bearings. Fifth, it is configured so that oil is picked up by the rotor from the bottom of the motor housing, carried by the rotor to the top of the motor housing, peeled off by the oil peelers, and redirected by the oil peeler redirector ribs into the oil feed reservoirs, where the oil travels by gravity through oil feed holes and into the ball bearings. Unlike the prior art, the present invention is a rotor-driven lubrication system.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A submersible-rated motor comprising:
   (a) a motor housing that is configured to enclose a stator and a rotor and to partially enclose a drive shaft, the motor housing comprising a drive end and a non-drive end;
   (b) a terminal plate assembly comprising a terminal box and a removable terminal cover, wherein the terminal box is cast directly onto the non-drive end of the motor housing, and wherein the terminal plate assembly is configured to receive one or more power conductors and to supply electrical power to the stator through a nonconductive terminal plate;
   (c) a combined seal/bearing housing situated at a front end of the motor housing and having a seal portion that extends forwardly from a center of the combined seal/bearing housing;
   (d) a rotating seal assembly, wherein the seal portion of the combined seal/bearing housing is configured to partially enclose the rotating seal assembly;
   (e) a drive-end oil peeler having a distal end, the distal end of the drive-end oil peeler being situated above a top of a proximal end of the rotor inside of the motor housing and configured to peel oil off of the top of the proximal end of the rotor while the rotor is rotating;
   (f) a non-drive-end oil peeler having a proximal end, the proximal end of the non-drive-end oil peeler being situated above a top of a distal end of the rotor inside of the motor housing and configured to peel oil off of the top of the distal end of the rotor while the rotor is rotating;
   (g) a first snap ring that is configured to secure the combined seal/bearing housing to the motor housing;
   (h) a first ball bearing that is situated inside of the combined seal/bearing housing on the drive shaft between the rotating seal assembly and the proximal end of the rotor; and
   (i) a second ball bearing that is situated inside of the motor housing on the drive shaft between the distal end of the rotor and the terminal plate assembly,
   wherein the rotating seal assembly comprises:
     a single, self-lubricating rotating seal;
     a seal spring; and
     a single-seal driver;
   wherein the rotating seal assembly is configured to rotate with the drive shaft; and
   wherein the seal spring is configured to apply axial load to the self-lubricating rotating seal.

2. The submersible-rated motor of claim 1, wherein a stationary seal face and a stationary seal O-ring are disposed on the drive shaft inside of the seal portion of the combined seal/bearing housing adjacent to a proximal end of the rotating seal assembly.

3. The submersible-rated motor of claim 1, wherein a bearing lock ring is situated on the drive shaft between the rotating seal assembly and the first ball bearing.

4. The submersible-rated motor of claim 1, wherein the first ball bearing is a double-row, angular contact bearing.

5. The submersible-rated motor of claim 1, further comprising a second snap ring that is configured to secure the first ball bearing to an inside of the combined seal/bearing housing.

6. The submersible-rated motor of claim 1, wherein the motor housing comprises a plurality of radial fins that are configured to dissipate heat generated by the motor.

7. The submersible-rated motor of claim 1, further comprising a first oil plug that is situated at a front bottom end of the motor housing and is configured to allow oil to be drained from a main oil reservoir situated inside and at a bottom of the motor housing.

8. The submersible-rated motor of claim 7, wherein the first oil plug is magnetized.

9. The submersible-rated motor of claim 1, wherein the motor housing comprises a lifting eye that is situated in a center of a top part of the motor housing on an outside of the motor housing.

10. The submersible-rated motor of claim 1, wherein the drive shaft comprises a key that is situated on a proximal end of the drive shaft; and wherein the drive shaft further comprises a stationary dust seal that is disposed on the drive shaft between the key and the seal portion of the combined seal/bearing housing.

11. The submersible-rated motor of claim 1, wherein the drive-end oil peeler comprises a redirector rib that is configured to direct oil that is peeled off of the rotor by the drive-end oil peeler through an oil teed hole in a first oil feed reservoir in the motor housing and into the first ball bearing, where the oil travels via gravity through the first ball bearing and into a main oil reservoir in a bottom of the motor housing.

12. The submersible-rated motor of claim 1, wherein the non-drive-end oil peeler comprises a redirector rib that is configured to direct oil that is peeled off of the rotor by the non-drive-end oil peeler through an oil feed hole in a second oil feed reservoir in the motor housing and into the second ball bearing, where the oil travels via gravity through the second ball bearing and into a secondary oil reservoir in a bottom of the motor housing.

\* \* \* \* \*